United States Patent
Jo et al.

(10) Patent No.: US 9,891,761 B2
(45) Date of Patent: Feb. 13, 2018

(54) TOUCH SENSING DEVICE AND TOUCHSCREEN DEVICE

(71) Applicant: Samsung Electronics Co., Ltd., Suwon-si, Gyeonggi-do (KR)

(72) Inventors: Byeoung Hak Jo, Suwon (KR); Moon Suk Jeong, Suwon (KR); Yong Il Kwon, Suwon (KR); Tah Joon Park, Suwon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 543 days.

(21) Appl. No.: 14/206,293

(22) Filed: Mar. 12, 2014

(65) Prior Publication Data

US 2015/0184989 A1    Jul. 2, 2015

(30) Foreign Application Priority Data

Dec. 30, 2013  (KR) .......................... 10-2013-0167353

(51) Int. Cl.
*G06F 3/044*     (2006.01)
*G06F 3/041*     (2006.01)

(52) U.S. Cl.
CPC ............ *G06F 3/044* (2013.01); *G06F 3/0416* (2013.01); *G06F 2203/04111* (2013.01)

(58) Field of Classification Search
CPC .................. G06F 3/044; G06F 3/047; G06F 2203/04106; G06F 2203/04111; G06F 2203/04108; G06F 2203/04101; H03K 17/962; H03K 17/955

See application file for complete search history.

(56) References Cited

U.S. PATENT DOCUMENTS

| | | | | |
|---|---|---|---|---|
| 4,978,959 A | * | 12/1990 | Chong | .................. H03F 3/3001 330/252 |
| 9,310,924 B2 | * | 4/2016 | Hanssen | ............ H03K 17/9622 |
| 2011/0122087 A1 | | 5/2011 | Jang et al. | |
| 2012/0032826 A9 | * | 2/2012 | Li | .......................... H03M 3/474 341/122 |
| 2015/0205405 A1 | * | 7/2015 | Yumoto | .................. G06F 3/044 345/174 |

FOREIGN PATENT DOCUMENTS

| KR | 10-2011-0057501 | 6/2011 |
|---|---|---|
| KR | 10-2011-0103790 | 9/2011 |
| KR | 10-2013-0104051 | 9/2013 |

* cited by examiner

*Primary Examiner* — William Boddie
*Assistant Examiner* — Jeffrey A Parker
(74) *Attorney, Agent, or Firm* — F. Chau & Associates, LLC

(57) ABSTRACT

There are provided a touch sensing device and a touchscreen device. The touch sensing device includes: a driving circuit applying a driving signal having a predetermined first period to a node capacitor; a buffer circuit converting capacitance of the node capacitor into a voltage signal; a buffer capacitor being charged and discharged depending on an output voltage from the buffer circuit; and an integration circuit integrating voltages charged in the buffer capacitor, wherein, in a normal touch mode, the buffer circuit integrates capacitance of the node capacitor to generate the voltage signal, and, in a proximity touch mode, the buffer circuit generates the voltage signal by following the voltages charged in the node capacitor.

28 Claims, 12 Drawing Sheets

TOUCH SENSING DEVICE AND TOUCHSCREEN DEVICE

CROSS-REFERENCE TO RELATED APPLICATION

This application claims the benefit of Korean Patent Application No. 10-2013-0167353 filed on Dec. 30, 2013, with the Korean Intellectual Property Office, the disclosure of which is incorporated herein by reference.

BACKGROUND

The present disclosure relates to a touch sensing device and a touchscreen device.

A touchscreen device, such as a touchscreen or a touch pad, is a data input device attached to a display device so as to provide an intuitive user interface, and has recently been widely applied to various electronic devices such as cellular phones, personal digital assistants (PDA), and navigation devices. Particularly, as demand for smartphones has been recently increased, touchscreens have been increasingly employed therein, since they are able to provide users with various data input methods in a limited form factor.

Touchscreens used in portable devices may be mainly divided into resistive type touchscreens and capacitive type touchscreens, depending on the manner in which touches are sensed therein. Among these, capacitive type touchscreens have advantages of a relatively long lifespan and ease in the implementation of various types of data input and gestures therefor, and thus it has been increasingly employed. It is especially easy to implement a multi-touch interfaces with capacitive type touchscreens, as compared to resistive type touchscreens, and thus, capacitive type touchscreens are widely used in smartphones and the like.

Capacitive type touchscreens include a plurality of electrodes having a predetermined pattern and the electrodes form a plurality of nodes in which changes in capacitance are generated due to touches. The nodes provided on a two-dimensional plane generate changes in self-capacitance or changes in mutual-capacitance due to touches. Coordinates of touches may be calculated by applying a weighted average calculation method or the like to changes in the capacitance occurring in the nodes.

Recently, applications allowing touchscreen devices to detect various types of gesture are being developed for increased user convenience. To this end, techniques of forming capacitance in wide areas around electrodes and of detecting minute changes in capacitance are required.

RELATED ART DOCUMENT (Patent Document 1) Korean Patent Laid-Open Publication No. 2011-0103790

SUMMARY

An aspect of the present disclosure may provide a touch sensing device and a touchscreen device capable of precisely detecting a proximity touch that is not made directly to a touch panel.

According to an aspect of the present disclosure, a touch sensing device may include: a driving circuit applying a driving signal having a predetermined first period to a node capacitor; a buffer circuit converting capacitance of the node capacitor into a voltage signal; a buffer capacitor being charged and discharged depending on an output voltage from the buffer circuit; and an integration circuit integrating voltages charged in the buffer capacitor, wherein, in a normal touch mode, the buffer circuit integrates capacitance of the node capacitor to generate the voltage signal, and, in a proximity touch mode, the buffer circuit generates the voltage signal by following the voltages charged in the node capacitor.

The driving circuit unit may include: a first switch connected between a first node of the node capacitor and a supply voltage terminal; and a second switch connected between the first node of the node capacitor and a common-mode voltage terminal, wherein the first and second switches are switched on and off by first and second clock signals, each of the first and second clock signals having a first period and the first and second clock signals having a phase difference of 180 degrees with respect to each other.

The buffer circuit may include: a first operational amplifier; a third switch connected between a second node of the node capacitor and an inverting input terminal of the first operational amplifier; a fourth switch connected between the second node of the node capacitor and the common-mode voltage terminal; a fifth switch connected between the inverting input terminal and an output terminal of the first operational amplifier; a sixth switch connected between the second node of the node capacitor and the non-inverting input terminal of the first operational amplifier; a seventh switch connected between the non-inverting input terminal of the first operational amplifier and the terminal of the common-mode voltage; and a first feedback capacitor connected to the fifth switch in parallel.

In the normal touch mode, the third switch may be switched on and off by a third clock signal having a predetermined second period, the fourth switch and the fifth switch may be switched on and off by a fourth clock signal having the second period, the sixth switch may be turned off, the seventh switch may be turned on, and the third clock signal and the fourth clock signal may have a phase difference of 180 degrees with respect to each other.

The second period may be equal to half of the first period.

In the proximity touch mode, the third switch, the fourth switch and the seventh switch may be turned off, and the fifth switch and the sixth switch may be turned on.

The integration circuit may include: a second operational amplifier; an eighth switch connected between the inverting input terminal of the second operational amplifier and the buffer capacitor; a ninth switch connected between the buffer capacitor and the common-mode voltage terminal; a tenth switch connected between the inverting input terminal and an output terminal of the second operational amplifier; and a second feedback capacitor connected to the tenth switch in parallel.

In the normal touch mode, the eighth switch may be switched on and off by a fifth clock signal having the first period, the ninth switch may be switched on and off by a sixth clock signal having the first period, and the fifth clock signal and the sixth clock signal may have a phase difference of 180 degrees with respect to each other.

The fifth clock signal may have a phase difference of 90 degrees with respect to the driving signal.

In the proximity touch mode, the eighth switch may be switched on and off by a fifth clock signal having the first period, the ninth switch may be switched on and off by a sixth clock signal having the first period, and the fifth clock signal and the sixth clock signal may have a phase difference of 180 degrees with respect to each other.

The fifth clock signal and the driving signal may be in-phase.

According to another aspect of the present disclosure, a touch sensing device may include: a driving circuit applying a driving signal having a predetermined first period to a node capacitor; a first operational amplifier having a non-inverting input terminal and an inverting input terminal connected to the node capacitor, and an output terminal connected to the inverting input terminal; a buffer capacitor being charged and discharged depending on an output voltage from the first operational amplifier; and an integration circuit integrating voltages charged in the buffer capacitor.

The driving circuit unit may include: a first switch connected between a first node of the node capacitor and a supply voltage terminal; and a second switch connected between the first node of the node capacitor and a common-mode voltage terminal, wherein the first and second switches are switched on and off by first and second clock signals, each of the first and second clock signals having a first period and the first and second clock signals having a phase difference of 180 degrees with respect to each other.

The integration circuit may include: a second operational amplifier; an eighth switch connected between the inverting input terminal of the second operational amplifier and the buffer capacitor; a ninth switch connected between the buffer capacitor and the common-mode voltage terminal; a tenth switch connected between the inverting input terminal and an output terminal of the second operational amplifier; and a second feedback capacitor connected to the tenth switch in parallel.

The eighth switch may be switched on and off by a fifth clock signal having the first period, the ninth switch may be switched on and off by a sixth clock signal having the first period, and the fifth clock signal and the sixth clock signal may have a phase difference of 180 degrees with respect to each other.

The fifth clock signal and the driving signal may be in-phase.

According to another aspect of the present disclosure, a touchscreen device may include: a panel unit including a plurality of first electrodes extending in a first direction, and a plurality of second electrodes extending in a second direction intersecting the first direction; a driving circuit unit applying driving signals to a portion of the plurality of first electrodes; and a sensing circuit unit detecting capacitance from a portion of the plurality of the second electrodes near one ends thereof and from a portion near the other ends thereof, wherein the sensing circuit unit includes at least one operational amplifier behaving as a voltage follower.

The sensing circuit unit may include: a first operational amplifier having a non-inverting input terminal and an inverting input terminal connected to the portion of the plurality of the second electrodes near one ends thereof and to the portion near the other ends thereof, and an output terminal connected to the inverting input terminal; a buffer capacitor being charged and discharged depending on an output voltage from the first operational amplifier; and an integration circuit integrating voltages charged in the buffer capacitor.

The others of the plurality of first and second electrodes, than the portion to which the driving signals are applied and the portion from which the sensing signals are detected, may be kept in a floating state.

The touchscreen device may further include: a signal conversion unit converting the capacitance detected in the sensing circuit unit into a digital signal; and an operation unit determining whether a touch is made based on the digital signal.

The operation unit may acquire first direction information of the touch based on the digital signal.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
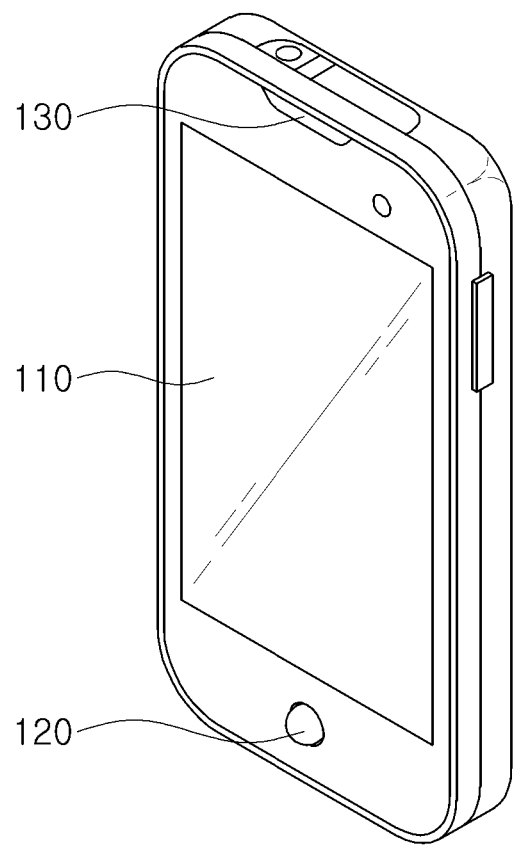
FIG. 1 is a perspective view showing an appearance of an electronic device including a touchscreen device according to an exemplary embodiment of the present disclosure.

FIG. 1 is a perspective view showing an appearance of an electronic device including a touchscreen device according to an exemplary embodiment of the present disclosure.

Referring to FIG. 1, the electronic device 100 according to the exemplary embodiment may include a display device 110 for displaying a screen, an input unit 120, an audio unit 130 for outputting a voice, and a touchscreen device integrated with the display device 110.

As shown in FIG. 1, it is common in mobile devices that a touchscreen device is integrated with a display device, and such a touchscreen device needs to have so high light transmittance that a screen displayed on the display device can be seen. Accordingly, such a touchscreen device may be implemented by forming an electrode with an electrically conductive material on a transparent substrate formed of a film such as polyethylene terephthalate (PET), polycarbonate (PC), polyethersulfone (PES), polyimide (PI), polymethylmethacrylate (PMMA), and cyclo-olefin polymer (COP), soda glass, or tempered glass. The conductive electrode may be formed of indium tin oxide (ITO), indium zinc oxide (IZO), zinc oxide (ZnO), carbon nano tube (CNT), or graphene, for example. Further, the conductive electrode may be implemented by forming any one of Ag, Al, Cr, Ni, Mo and Cu or an alloy thereof as a non-visible fine conductor lines. In a bezel area of the display device, wiring patterns connected to electrodes formed of a transparent, conductive material are arranged, and the wire patterns are shielded by the bezel area so that they are not visible.

Since the touchscreen device according to the exemplary embodiment is of a capacitive type, the touchscreen device may include a plurality of electrodes having a predetermined pattern. Further, the touchscreen device may include a capacitance sensing circuit to sense changes in the capacitance formed in the plurality of electrodes, an analog-digital conversion circuit to convert an output signal from the capacitance sensing circuit into a digital value, and an operation circuit to determine whether a touch is made using the data converted into digital value.

Figure 2:
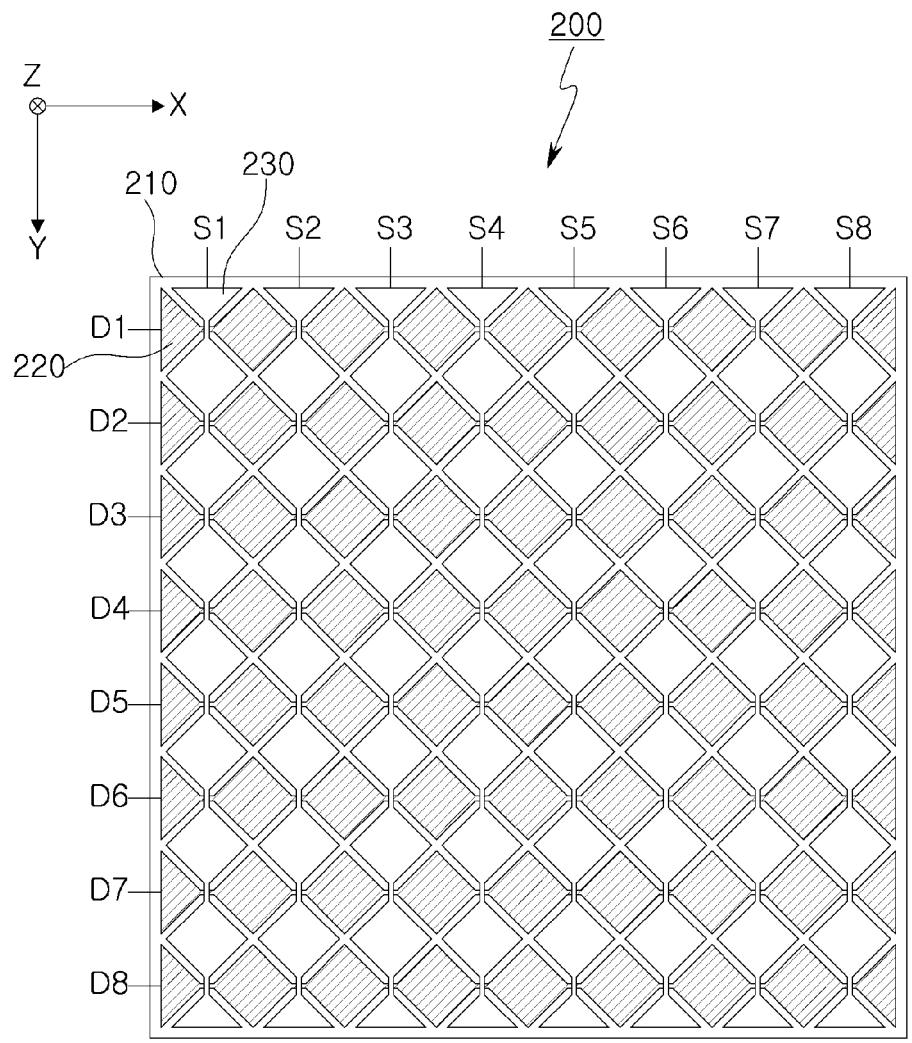
FIG. 2 is a view of a panel unit included in a touchscreen device according to an exemplary embodiment of the present disclosure.

FIG. 2 is a view of a panel unit included in a touchscreen device according to an exemplary embodiment of the present disclosure.

Referring to FIG. 2, the panel unit 200 according to the exemplary embodiment includes a substrate 210 and a plurality of electrodes 220 and 230 provided on the substrate 210. Although not shown in FIG. 2, each of the plurality of electrodes 220 and 230 may be electrically connected to a wiring pattern on a circuit board attached to one end of the substrate 210 through a wiring and a bonding pad. The circuit board may have a controller integrated circuit mounted thereon so as to detect sensing signals generated in the plurality of electrodes 220 and 230 and may determine whether a touch is made based on the detected sensing signals.

In a touchscreen device, the substrate 210 may be a transparent substrate on which the plurality of electrodes 220 and 230 are formed. On the region in which wirings for connecting to the plurality of electrodes 220 and 230 are provided, other than the region in which the plurality of electrodes 220 and 230 are provided, a printed region may be formed on the substrate 210 so as to shield the wirings typically formed of an opaque metal material so that they are not visible.

The plurality of electrodes 220 and 230 may be formed on one surface or both surfaces of the substrate 210. Although the plurality of electrodes 220 and 230 are shown to have a lozenge- or diamond-shaped pattern in FIG. 2, it is apparent that the plurality of electrodes 220 and 230 may have a variety of polygonal shapes such as rectangle and triangle.

The plurality of electrodes 220 and 230 may include first electrodes 220 extending in the x-axis direction, and second electrodes 230 extending in the y-axis direction. The first electrodes 220 and the second electrodes 230 may be provided on both surfaces of the substrate 210 or may be provided on different substrates 210 such that they may intersect with each other. If all of the first electrodes 220 and the second electrodes 230 are provided on one surface of the substrate 210, an insulating layer may be partially formed at intersection points between the first electrodes 220 and the second electrodes 230.

A device, which is electrically connected to the plurality of electrodes 220 and 230 to sense a touch, detects changes in capacitance generated in the plurality of electrodes 220 and 230 by a touch to sense the touch based on the detected change in capacitance. The first electrodes 220 may be connected to channels defined as D1 to D8 in the controller integrated circuit to thereby receive driving signals, and the second electrodes 230 may be connected to channels defined as S1 to S8 to thereby be used for the controller integrated circuit to detect sensing signals.

The controller integrated circuit may acquire changes in capacitance generated among the first electrodes 220 and the second electrodes 230, to use them as sensing signals.

Figure 3:
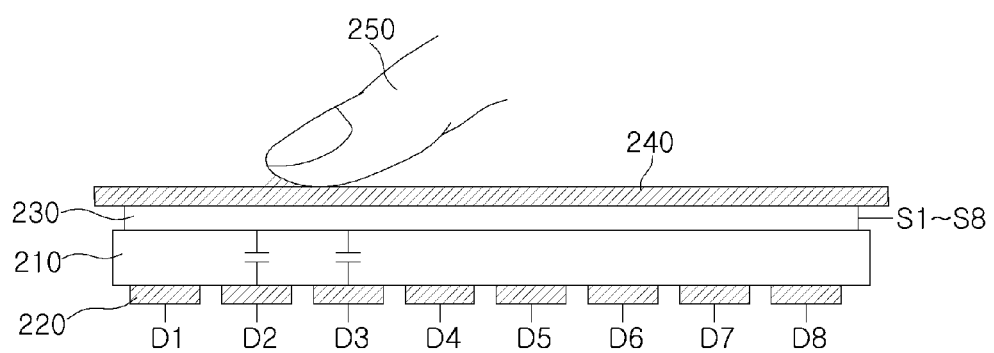
FIG. 3 is a cross-sectional view of the panel unit illustrated in FIG. 2.

FIG. 3 is a cross-sectional view of the panel unit illustrated in FIG. 2. FIG. 3 is a cross-sectional view of the panel unit 200 illustrated in FIG. 2 taken in the y-z plane, in which the panel unit 200 may further include a cover lens 240 that is touched, in addition to the substrate 210 and the plurality of electrodes 220 and 230 described with reference to FIG. 2. The cover lens 240 may be provided on the second electrodes 230 to receive a touch from a touching object 250 such as a finger.

When driving signals are sequentially applied to the first electrodes 220 through the channels D1 to D8, mutual-capacitance is generated between the first electrodes 220, to which the driving signals are applied, and the second electrodes 230. When the driving signals are sequentially applied to the first electrodes 220, changes in the mutual-capacitance is made between the first electrode 220 and the second electrode 230 close to the area with which the touching object 270 comes in contact. The change in the mutual-capacitance may be proportional to the overlapped area between the region that the touching object 270 comes into contact, and the region that the first electrodes 220, to which the driving signals are applied, and the second electrodes 230. In FIG. 3, the mutual-capacitance generated between the first electrodes 220 connected to channel D2 and D3, respectively, and the second electrodes 230 is influenced by the touching object 270

Figure 4:
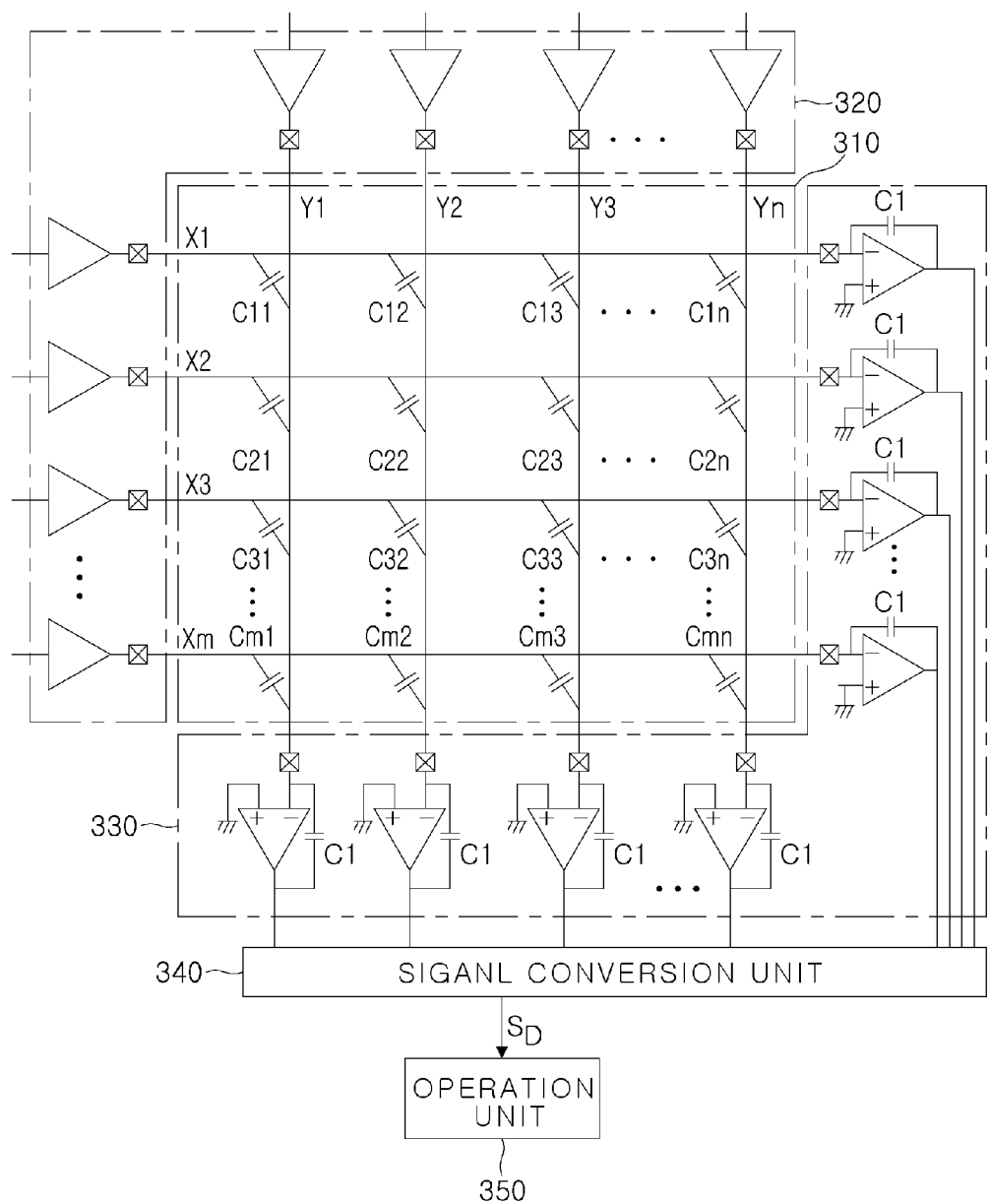
FIG. 4 is a diagram illustrating a touchscreen device according to an exemplary embodiment of the present disclosure.

FIG. 4 is a diagram illustrating a touchscreen device according to an exemplary embodiment of the present disclosure.

Referring to FIG. 4, the touchscreen device according to the exemplary embodiment may include a panel unit 310, a driving circuit unit 320, a sensing circuit unit 330, a signal converting unit 340, and an operating unit 350. The driving circuit unit 320, the sensing circuit unit 330, the signal converting unit 340, and the operating unit 350 may be implemented as a single controller integrated circuit (IC), i.e., a control circuit.

The panel unit 310 may include a plurality of first electrodes X1 to Xm extending in a first axis direction (that is, the horizontal direction of FIG. 4), and a plurality of second electrodes Y1 to Yn extending in a second axis direction (that is, the vertical direction of FIG. 4) crossing the first axis direction.

Figure 5:
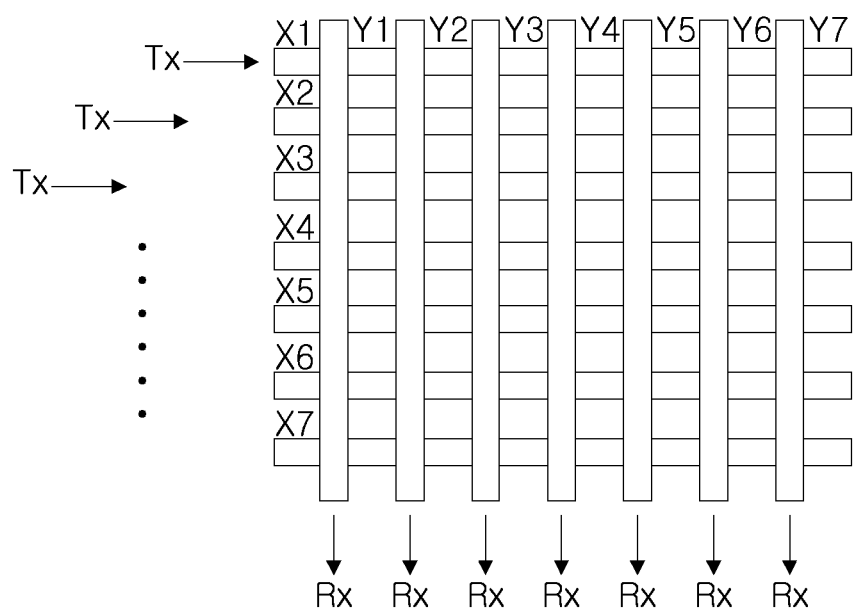
FIGS. 5 through 9 are diagrams for illustrating the operation of a touchscreen device according to an exemplary embodiment of the present disclosure.

As described above, when a voltage is applied to a plurality of first electrodes X1 to Xm and a plurality of second electrodes Y1 to Yn, capacitance may be generated, and, in FIG. 5, capacitance generated at intersections of the plurality of first electrodes X1 to Xm and the plurality of second electrodes Y1 to Yn are denoted by node capacitors C11 to Cmn. Further, although not shown in FIG. 5, it is to be understood that capacitance may also be formed between the first electrodes X1 to Xm and between the second electrodes Y1 to Yn.

The driving circuit unit 320 may apply predetermined driving signals to the first electrodes X1 to Xm and to the second electrodes Y1 to Yn of the panel unit 510. The driving signals may be square wave signals, sine wave signals, triangle wave signals, or the like, having specific frequency and amplitude. Although circuits for generating and applying the driving signals are individually connected to the plurality of first and second electrodes X1 to Xm and Y1 to Yn in FIG. 4, it is apparent that a single driving signal generating circuit may be used to apply the driving signals to the first electrodes X1 to Xm and to the second electrodes Y1 to Yn by employing a switching circuit.

The sensing circuit unit 330 may be connected to the first and second electrodes X1 to Xm and Y1 to Yn to receive sensing signals and may detect changes in capacitance based on the received sensing signals. The sensing circuit unit 330 may include C-V converters to detect changes in capacitance as voltage. For example, each of the C-V converters may include at least one operational amplifier and a capacitor C1 having a specific capacitance and may integrate changes in capacitance to output an analog signal in the form of voltage.

The signal conversion unit 340 may generate a digital signal $S_D$ from the analog signals transmitted from the sensing circuit unit 330. For example, the signal conversion unit 340 may include a time-to-digital converter (TDC) circuit measuring a time in which the analog signals in the form of voltage output from the sensing circuit unit 330 reach a predetermined reference voltage level to convert the measured time into the digital signal $S_D$, or an analog-to-digital-converter (ADC) circuit measuring an amount by which a level of the analog signals output from the sensing circuit unit 330 is changed for a predetermined time to convert the changed amount into the digital signal $S_D$.

The operation unit 350 may determine whether a touch is made on the panel unit 310 based on the digital signal $S_D$. The operation unit 350 may determine the number of touches, coordinates of the touches, and the type of gesture of the touches or the like made on the panel unit 310, based on the digital signal $S_D$.

The digital signal $S_D$, which is used by the operation unit 350 to determine whether a touch is made, may be data that is a numerical value representing a change in capacitance of the capacitors C11 to Cmn, especially representing a difference between the capacitance with and without a touch. Typically in a capacitive type touchscreen device, a region touched by a conductive object has less capacitance than other regions not touched.

Figure 6:
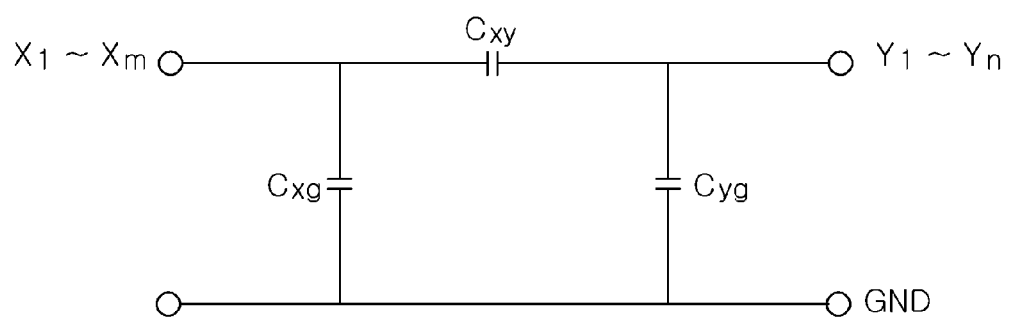
Figure 7:
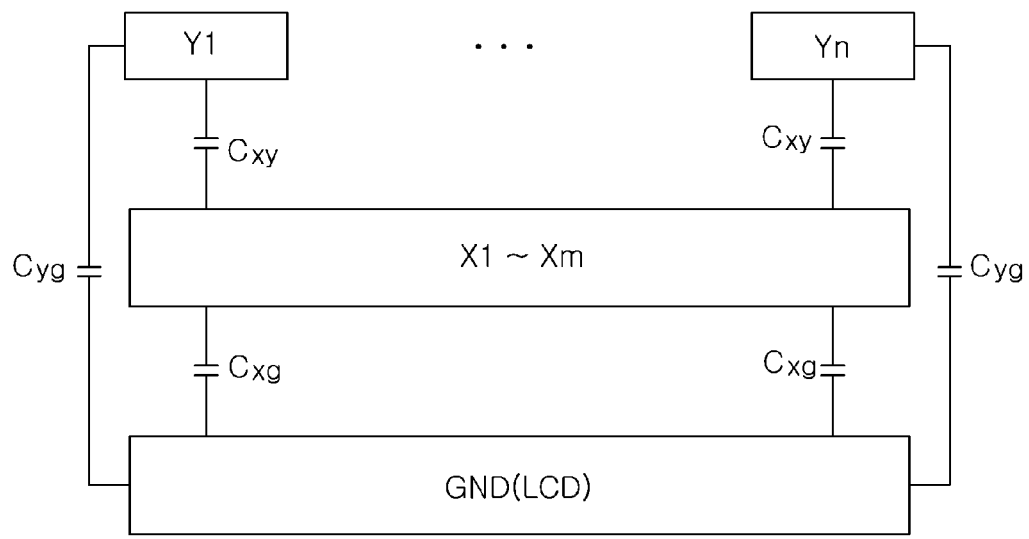
Figure 8:
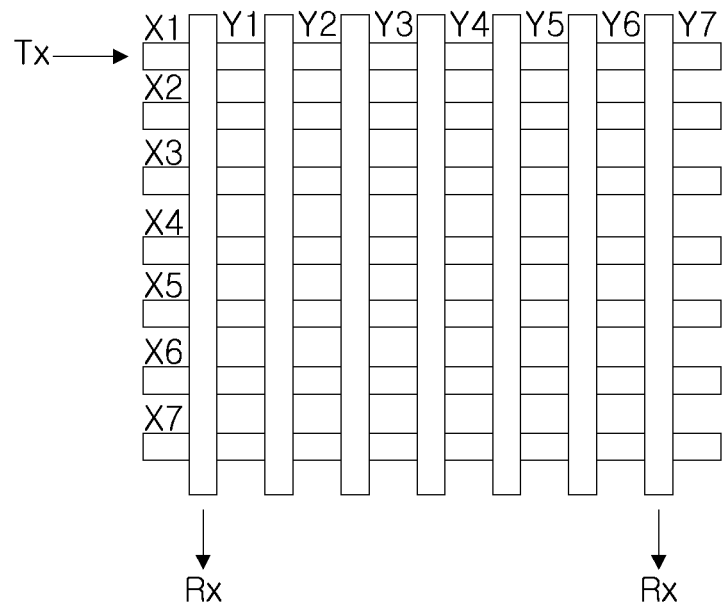
Figure 9:
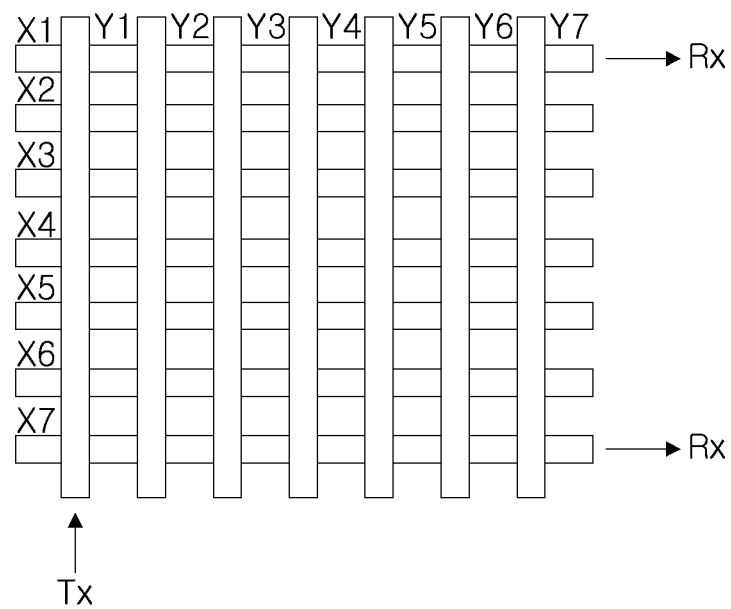

FIGS. 5 through 9 are diagrams for illustrating the operation of a touchscreen device according to an exemplary embodiment of the present disclosure. In FIGS. 5, 8 and 9, Tx refers to driving signals generated in the driving circuit unit 320 of FIG. 4, and Rx refers to sensing signals acquired by the sensing circuit unit 330. Although only a portion of the first and second electrodes X1 to Xm and Y1 to Yn of FIG. 4 are shown for simplicity, it is apparent that more electrodes may be formed as shown in FIG. 4.

Hereinafter, a method of driving a touchscreen device according to the exemplary embodiment will be described with reference to FIGS. 4 through 7.

FIG. 5 is a diagram for illustrating the operation of a touchscreen device in a normal touch mode according to an exemplary embodiment of the present disclosure.

In the normal touch mode, the driving circuit unit 320 may sequentially apply driving signals Tx to the plurality of first electrodes X1 to X7, and the sensing circuit unit 330 may be connected to the second electrodes Y1 to Y7 to acquire sensing signals Rx according to capacitance formed at intersections of the first electrodes X1 to X7 and the second electrodes Y1 to Y7.

For example, when a driving signal Tx is applied to the first one X1 of the first electrodes, capacitance is formed at each of intersections of the first one X1 of the first electrodes and the second electrodes Y1 to Y8, such that the sensing circuit unit 330 may acquire sensing signals Rx according to capacitance from the second electrodes.

It is to be noted that exemplary embodiments of the present disclosure are not limited thereto, but the driving signals Tx may be sequentially applied to the second electrodes Y1 to Y7, such that sensing signals Rx may be acquired from the first electrodes X1 to X7.

FIGS. 6 and 7 are diagrams for illustrating capacitance generated on a panel unit according to an exemplary embodiment of the present disclosure.

Referring to FIGS. 6 and 7, on the panel unit 310 according to an exemplary embodiment of the present disclosure, there may be mutual capacitance Cxy generated at each of intersections of the first electrodes and the second electrodes, parasitic capacitance Cxg generated between the first electrodes and ground potential GND, parasitic capacitance Cyg generated between the second electrodes and ground GND potential. The ground potential (GND) corresponds to the voltage level of a display device such as an LCD that is integrated with the touchscreen device.

In general, the mutual capacitance Cxy generated at each of intersections of the first electrodes and the second electrodes takes a large portion of the total capacitance on the panel unit. From a portion of the first electrodes disposed near ends thereof and from a portion of the second electrodes disposed near ends thereof, however, parasitic capacitances Cxg and Cyg may be detected relatively largely because they are less affected by the other electrodes. The parasitic capacitances Cxg and Cyg tend to be more widely generated than the mutual capacitance because the distance from the electrodes to a LCD is longer than that between the electrodes. According to the exemplary embodiment, by detecting the parasitic capacitances Cxg and Cyg, it may be determined whether a proximity touch is made.

FIGS. 8 and 9 are diagrams for illustrating the operation of a touchscreen device in a proximity touch mode according to an exemplary embodiment of the present disclosure. In the proximity touch mode according to the exemplary embodiment, a touchscreen device may alternately perform operations of acquiring first direction information and second direction information at a predetermined interval. In the following, the operation of the touchscreen device according to the embodiment of the present disclosure will be described in detail with reference to FIGS. 8 and 9.

Referring to FIG. 8, the driving circuit unit 320 may apply a driving signal Tx to the first one X1 of the first electrodes X1 to X7, and the sensing circuit unit 330 may acquire a sensing signal Rx from the first one Y1 and the seventh one Y7 of the second electrodes Y1 to Y7. At this time, the second one X2 to the seventh one X7 of the first electrodes to which no driving signal Tx is applied and the second one Y2 to the sixth one Y6 of the second electrodes from which no sensing signal is detected may be in a floating state. Accordingly, magnetic field may widely propagate so that capacitance may be generated on other areas, as well as limited areas such as the intersection of the first one X1 of the first electrodes and the first one Y1 of the second electrodes or the intersection of the first one X1 of the first electrodes and the seventh one Y7 of the second electrodes. Therefore, capacitance are generated over large areas, even when a touching object such as a finger or a stylus pen is not directly touched on but proximate to the panel unit, it may be determined whether the touching object is at the first one Y1 or at the seventh one Y7 of the second electrodes. In other words, according to the exemplary embodiment, first direction information, i.e., information on the direction in which first electrodes extend of a touch may be acquired.

Although the driving signal Tx is applied to the first one X1 of the first electrodes in the above exemplary embodiment, exemplary embodiments of the present disclosure is not limited thereto. The driving signal Tx may be applied to any one of the first electrodes, and, in addition to applying the driving signal Tx to one of the first electrodes, driving signals Tx may be applied to a portion or all of the first electrodes simultaneously.

Moreover, although the sensing circuit unit 330 acquires sensing signals Rx from the first one Y1 and seventh one Y7 of the second electrodes at the ends thereof in the above description, it is apparent that sensing circuit unit 330 may acquire sensing signals Rx from a portion of electrodes near the ends of the second electrodes, e.g., first, second, sixth and seventh ones Y1, Y2, Y6 and Y7 of the second electrodes.

Referring to FIG. 9, the driving circuit unit 320 may apply a driving signal Tx to the first one Y1 of the second electrodes Y1 to Y7, and the sensing circuit unit 330 may acquire a sensing signal Rx from the first one X1 and the seventh one X7 of the first electrodes X1 to X7.

The operation of the touchscreen device according to the exemplary embodiment of FIG. 9 is similar to that of the touchscreen device according to the exemplary embodiment of FIG. 8 and, therefore, the description on the exemplary embodiment of FIG. 8 may be applied, mutatis mutandis, to the exemplary embodiment of FIG. 9.

Unlike the exemplary embodiment of FIG. 8 in which the touchscreen device acquires the first direction information in which first electrodes extend of a touch, the touchscreen device according to the exemplary embodiment of FIG. 9 may acquire second direction information in which the second electrodes extend of a touch.

Figure 10:
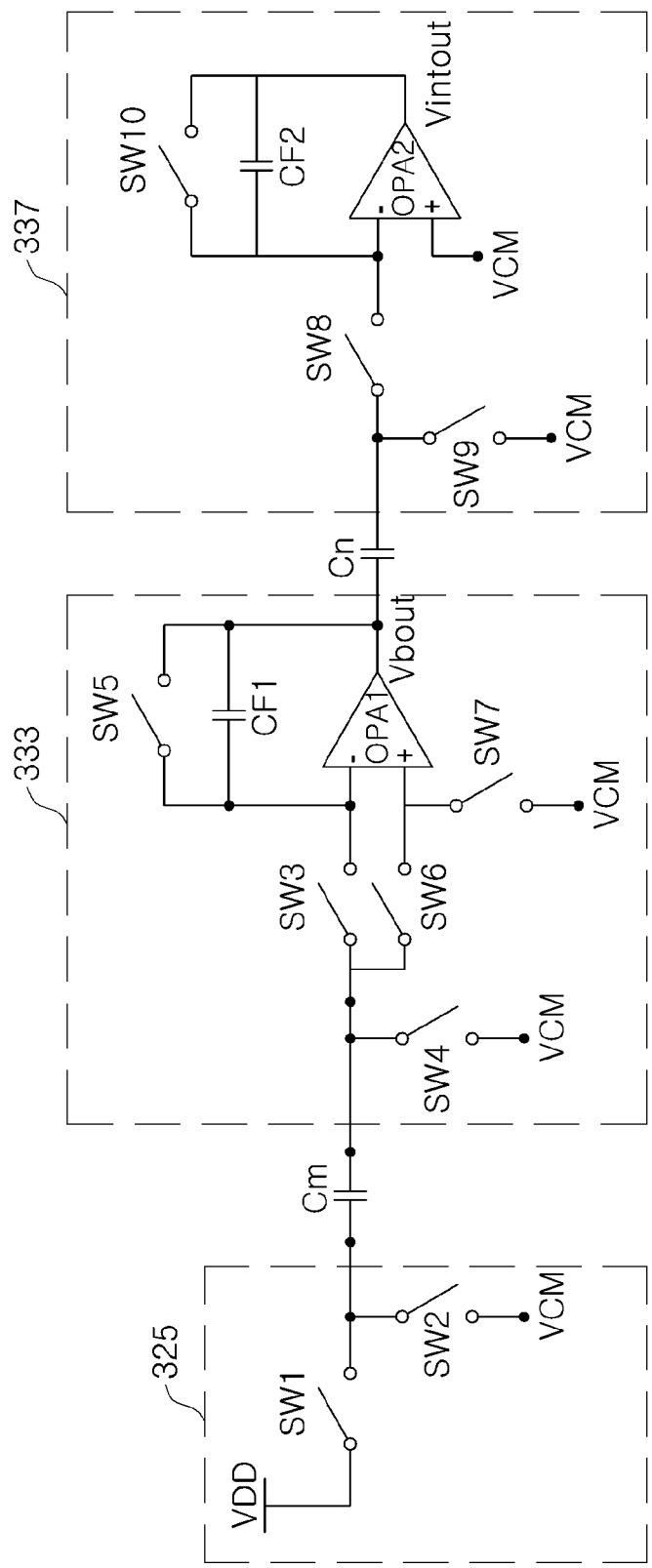
FIG. 10 is a circuit diagram of a touch sensing device included in the touchscreen device of FIG. 4.

FIG. 10 is a circuit diagram of a touch sensing device included in the touchscreen device of FIG. 4. The touch sensing device of FIG. 10 may include a drive circuit 325, a buffer circuit 333, a buffer capacitor Cn, and an integration circuit 337. The drive circuit 325 may be included in the driving circuit unit 320, and the buffer circuit 333, the buffer capacitor Cn and the integration circuit 337 may be included in the sensing circuit unit 330 of FIG. 11. The capacitor Cm of FIG. 10 may correspond to node capacitors C11 to Cmn of FIG. 4.

The driving circuit 325 may include switches SW1 and SW2, and the switch SW1 may be connected between a first node of the node capacitor Cm and the supply voltage terminal VDD. The switch SW2 may be connected between the first node of the node capacitor Cm and the common-mode voltage terminal VCM. The switches SW1 and SW2 may deliver driving signals to the node capacitor Cm such that one is closed while the other is open.

The buffer circuit 333 may include an operational amplifier OPA1, a feedback capacitor CF1, and switches SW3 to SW7. The switch SW3 may be connected between the second node of the node capacitor Cm and the inverting input terminal of the operation amplifier OPA1, and the switch SW4 may be connected between the second node of the node capacitor Cm and the terminal of the common-mode voltage VCM. The switch SW5 may be connected between the inverting input terminal of the operational amplifier OPA1 and the output thereof, the switch SW6 may be connected between the second node of the node capacitor Cm and the non-inverting input terminal of the operational amplifier OPA1, and the switch SW7 may be connected between the non-inverting input terminal of the operational amplifier OPA1 and the terminal of the common-mode voltage VCM. The feedback capacitor CF1 may be connected in parallel to the fifth switch SW5, and the non-inverting input terminal of the operational amplifier OPA1 may be connected to the terminal of the common-mode voltage VCM.

By the switching operations of the switches SW1 and SW7, a predetermined voltage is delivered to the node capacitor Cm, and by the switching operation of the switches SW2 to SW7, the charged stored in the node capacitor Cm may be output at the output terminal of the operational amplifier OPA1 as the output voltage $V_{bout}$.

The first node of the buffer capacitor Cn may be connected to the output terminal of the operational amplifier OPA1, and the buffer capacitor Cn may be charge or discharged depending on the amplitude and polarity of the output voltage $V_{bout}$.

The integration circuit 337 may include an operational amplifier OPA2, a feedback capacitor CF2, and switches SW8 to SW10. The switch SW8 may be connected between the second node of the buffer capacitor Cn and the inverting input terminal of the operation amplifier OPA2, and the switch SW9 may be connected between the second node of the buffer capacitor Cn and the common-mode voltage terminal VCM. The switch SW10 may be connected between the inverting input terminal of the operational amplifier OPA2 and the non-inverting input terminal thereof, and the feedback capacitor CF2 may be connected in parallel to the switch SW10. The non-inverting input terminal of the operational amplifier OPA2 may be connected to the common-mode voltage terminal VCM.

By the switching operations of the switches SW8 and SW9, the charged stored in the buffer capacitor Cn may be output at the output terminal of the operational amplifier OPA2 as non-inverted output voltage $V_{intout}$.

Figure 11:
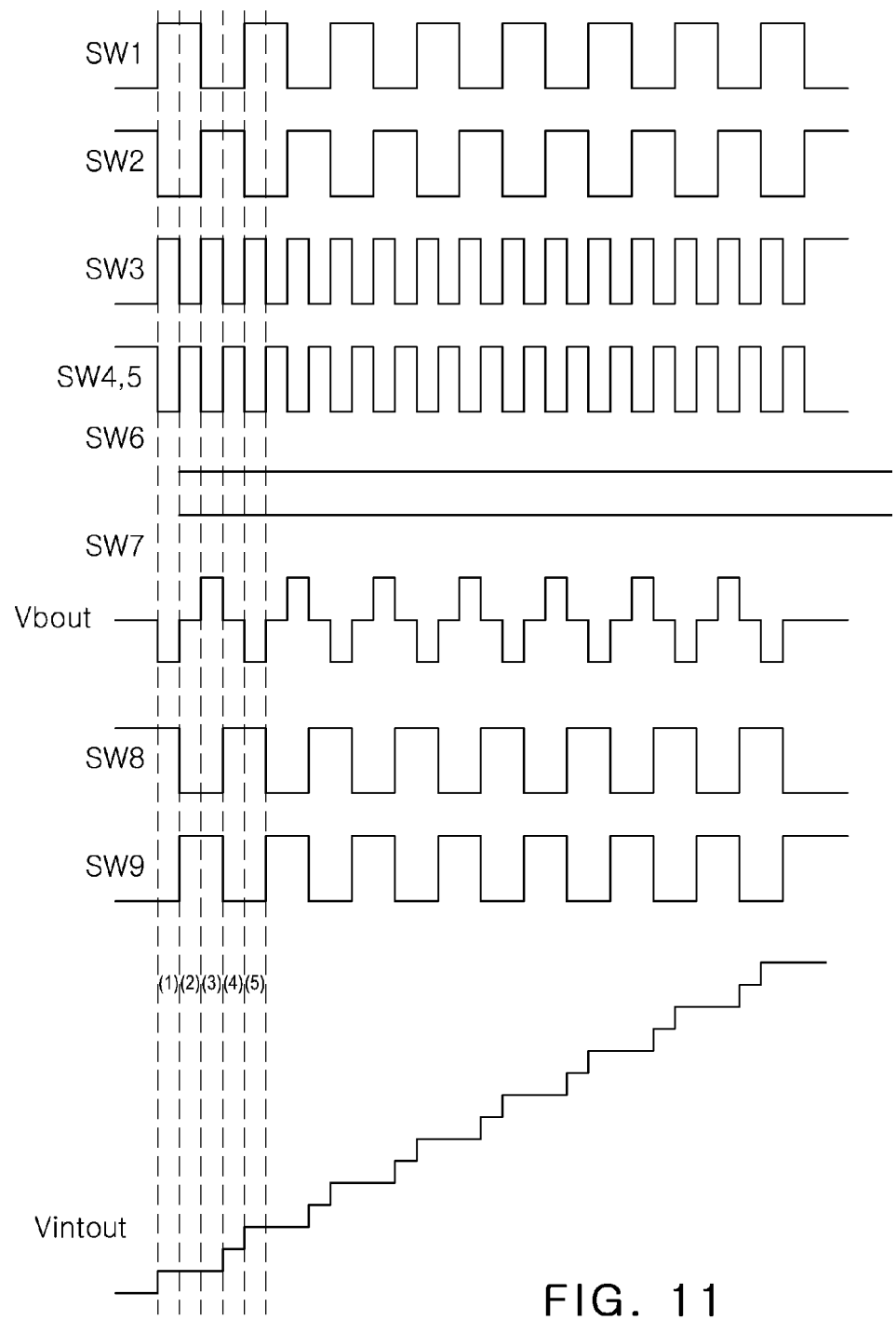
FIG. 11 is a diagram for illustrating the operation of a touch sensing device in a normal touch mode according to an exemplary embodiment of the present disclosure.

FIG. 11 is a diagram for illustrating the operation of a touch sensing device in a normal touch mode according to an exemplary embodiment of the present disclosure. Specifically, FIG. 11 illustrates clock signals applied to the switches SW1 to SW9 and output voltages, in which the switches are turned on when a clock signal of high level is applied thereto and are turned off when a clock signal of low level is applied thereto. In FIG. 11, $V_{bout}$ represents the output voltage from the operational amplifier OPA1 in the buffer circuit 333, and $V_{intout}$ represents the output voltage from the operational amplifier OPA2 in the integration circuit 337. In the normal touch mode, the switch SW6 is turned off while the switch SW7 is turned on, and thus the switch SW6 and the switch SW7 will not be described in detail.

In the following, the operation of the touch sensing device according to an embodiment of the present disclosure will be described in detail with reference to FIGS. 10 and 11.

In section 1, the switches SW1, SW3 and SW8 are turned on while the switches SW2, SW4 and SW9 are turned off, such that charges which are stored in the capacitor Cm in the buffer circuit unit with the voltage equal to VDD−VCM are non-inverted and integrated to be output. The output voltage $V_{bout1}$ output from the operational amplifier OPA1 in the buffer circuit 333 during section 1 may expressed as Mathematical Expression 1. Where the value of the common voltage VCM is equal to VDD/2, and $V_{noise1}$ denotes the magnitude of noise introduced in section 1.

$$Vbout1 = VCM - \frac{Cm}{CF1}*(VDD - VCM - Vnoise1) \qquad \text{[Mathematical Expression 1]}$$

At this time, charges are stored in the buffer capacitor Cn with the voltage equal to $V_{bout1}$−VCM, and the charges stored in the buffer capacitor Cn may be integrated through the integration circuit 337 to then be output. The increment ΔVintout1 in the non-inverted output voltage $V_{intout}$ from the integration circuit 337 during section 1 may be expressed as Mathematical Expression 2:

$$\Delta Vintout1 = \frac{Cm}{CF1}\frac{Cn}{CF2}*(VDD - VCM - Vnoise1) \qquad \text{[Mathematical Expression 2]}$$

In section 2, the switches SW1, SW4, SW5, and SW9 are turned on while the switches SW2, SW3, and SW8 are turned off. The switches SW1 and SW4 are turned on so that charges are stored in the node capacitor Cm with voltage equal to VDD−VCM, and the switch SW5 is turned on so that the operational amplifier OPA1 is reset and the operation amplifier OPA1 outputs common-mode voltage VCM. The switch SW8 may be turned off so that the output voltage $V_{intout}$ from the integration circuit 337 may be hold.

In section 3, the switches SW2, SW3 and SW9 are turned on while the switches SW1, SW4, SW5 and SW8 are turned off. The switches SW2 and SW3 are turned on so that the charges stored in the capacitor Cm with the voltage equal to VDD−VCM are released, and the output voltage $V_{bout2}$ output from the operational amplifier OPA1 may be expressed as Mathematical Expression 3:

$$Vbout2 = VCM + \frac{Cm}{CF1}*(VCM + Vnoise2) \qquad \text{[Mathematical Expression 3]}$$

Where $V_{noise2}$ denotes noise introduced in section 3.

In addition, in section 3, the switch SW8 is turned off, the switch SW9 is turned on, such that the output voltage $V_{intout}$ from the integration circuit unit is hold, and charges are stored in the buffer capacitor Cn with voltage equal to $V_{bout2}$−VCM.

In section 4, the switches SW2, SW4, SW5, and SW8 are turned on while the switches SW1, SW3, and SW9 are turned off. The switch SW5 is turned on, and the operational amplifier OPA1 is reset, such that the operational amplifier OPA1 output common-mode voltage VCM. At this time, the switch SW8 is turned on and the switch SW9 is turned off, such that the charges are stored in the buffer capacitor Cn with voltage equal to $V_{bout2}$−VCM are released. At this time, the increment ΔVintout2 in the output voltage $V_{intout}$ from the integration circuit 337 may be expressed as Mathematical Expression 4.

$$\Delta Vintout2 = \frac{Cm}{CF1}\frac{Cn}{CF2}*(VCM + Vnoise2) \qquad \text{[Mathematical Expression 4]}$$

In summary, during one period in which the switches SW1 and SW2 are once switched on/off and off/on, the increment ΔVintout in the output voltage integrated in the integration circuit 337 may be expressed as Mathematical Expression 5:

$$\Delta Vintout = \Delta Vintout1 + \Delta Vintout2 = \qquad \text{[Mathematical Expression 5]}$$
$$\frac{Cm}{CF1}\frac{Cn}{CF2}(VDD - VCM - Vnoise1) +$$

-continued
$$\frac{Cm}{CF1}\frac{Cn}{CF2}(VCM + Vnoise2) = \frac{Cm}{CF1}$$
$$\frac{Cn}{CF2}*(VDD + (Vnoise2 - Vnoise1))$$

If the $V_{noise1}$ is equal to the $V_{noise2}$, it can be seen that common noise is removed in the resulting output from the integration circuit 337. That is, while one period of a driving signal is applied to the capacitor Cm by the switches SW1 and SW2, integration is performed twice in the positive and negative regions, such that the common noise may be efficiently removed.

Figure 12:
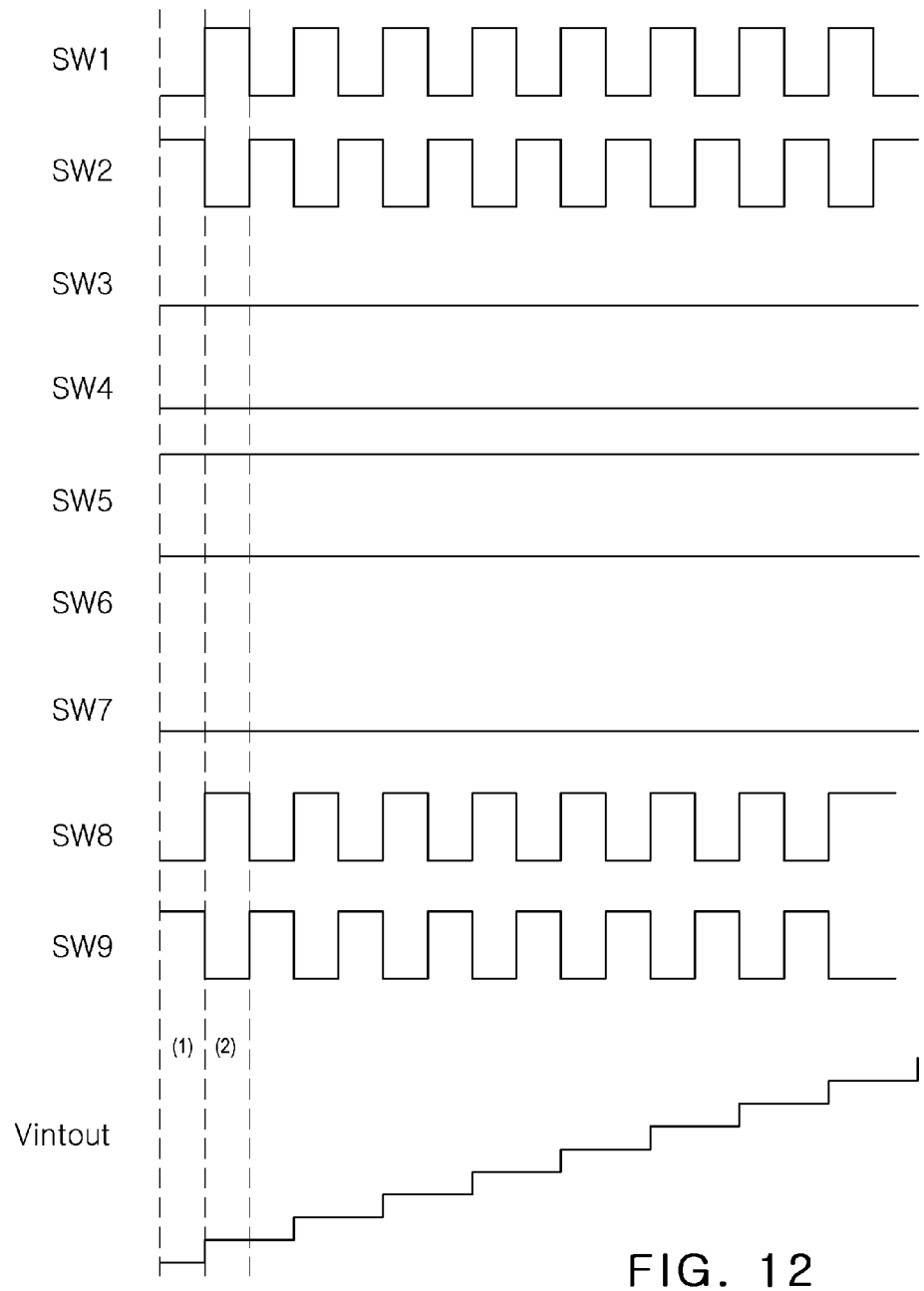
FIG. 12 is a diagram for illustrating the operation of a touch sensing device in a proximity touch mode according to an exemplary embodiment of the present disclosure.

FIG. 12 is a diagram for illustrating the operation of a touch sensing device in a proximity touch mode according to an exemplary embodiment of the present disclosure.

Specifically, FIG. 12 illustrates clock signals applied to the switches SW1 to SW9 and output voltages, in which the switches are turned on when a clock signal of high level is applied thereto and are turned off when a clock signal of low level is applied thereto. In FIG. 12, $V_{bout}$ represents the output voltage from the operational amplifier OPA1 in the buffer circuit 333, and $V_{intout}$ represents the output voltage from the operational amplifier OPA2 in the integration circuit 337.

This exemplary embodiment relates to the proximity touch mode, in which clock signals of FIG. 12 may be applied to the driving circuit 325, the buffer circuit 333, and the integration circuit 337 which are described with respect to FIGS. 8 and 9, among the plurality of driving circuits 325, the buffer circuit 333, and the integration circuit 337 included in the driving circuit unit 320 and the sensing circuit unit 330 of FIG. 4.

Figure 13:
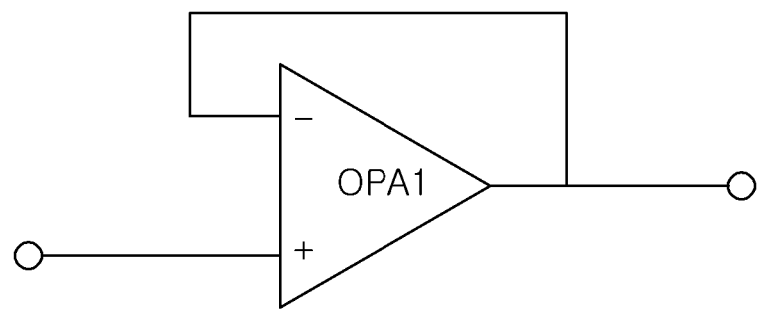
FIG. 13 is an equivalent circuit of a buffer circuit in a proximity touch mode according to an exemplary embodiment of the present disclosure.

In the proximity touch mode, since switches SW3, SW4 and SW7 are turned off and the switches SW5 and SW6 are turned on, the buffer circuit 333 may equivalently represented by the voltage follower shown in FIG. 13. Since the buffer circuit 333 may be equivalently represented by the voltage follower, the voltage signal applied to the non-inverting input terminal of the first operational amplifier OPA1 may be output at the output terminal losslessly, and accordingly the components of the parasitic capacitances Cxg and Cyg may be integrated by the integration circuit 337 losslessly.

In the above-description, each of the second electrodes Y1 to Ym has the sensing circuit unit 330 including the buffer circuit 333, the buffer capacitor Cn, and the integration circuit 337 connected thereto. In addition to this, the voltage follower, the buffer capacitor and the integration circuit for acquiring sensing signals for proximity touch may be connected to a portion of electrodes disposed near the ends of the first and second electrodes.

In the following, the operation of the touch sensing device according to an embodiment of the present disclosure will be described in detail with reference to FIGS. 10 and 12.

In section 1, the switches SW2 and SW9 are turned on, the switches SW1 and SW8 are turned off, such that the voltage $V_{bout}$ output from the buffer circuit 333 is 0 V, and charges are stored in the buffer capacitor Cn with the voltage equal to Cn*VCM.

In section 2, the switches SW1 and SW8 are turned on, the switches SW2 and SW9 are turned off, such that voltage $V_{bout}$ that is applied to the non-inverting input terminal of the buffer circuit 333 to be output to the operational amplifier OPA2 is equal to (Cm/(Cm+Cg))*VDD. The parasitic capacitance Cg may correspond to the parasitic capacitance Cxg illustrated in FIGS. 6 and 7 when a change in capacitance is detected from the first electrodes and may correspond to the parasitic capacitance Cyg illustrated in FIGS. 6 and 7 when a change in capacitance is detected from the second electrodes.

At this time, charges are stored in the buffer capacitor Cn with a voltage equal to $Cn*(VCM+V_{bout})$, the voltage $V_{intout}$ output from the operational amplifier OPA2 is equal to $(Cn*V_{bout})/CF2$.

That is, the resulting output voltage $V_{intout}$ during one period may be expressed as Mathematical Expression 6 below: Sine there are components for the parasitic capacitance Cg in $V_{intout}$ a proximity touch can be precisely determined.

$$Vintout = \frac{Cn}{CF2} * \frac{Cm}{Cm+Cg} * VDD \quad \text{[Mathematical Expression 6]}$$

As set forth above, according to exemplary embodiments of the present disclosure, a proximity touch that is not made directly to a touch panel can be precisely detected.

While exemplary embodiments have been shown and described above, it will be apparent to those skilled in the art that modifications and variations could be made without departing from the spirit and scope of the present disclosure as defined by the appended claims.

What is claimed is:

1. A touch sensing device, comprising:
   a driving circuit applying a driving signal having a predetermined first period to a node capacitor;
   a buffer circuit converting capacitance of the node capacitor into a voltage signal;
   a buffer capacitor being charged and discharged depending on an output voltage from the buffer circuit; and
   an integration circuit integrating voltages charged in the buffer capacitor,
   wherein, in a normal touch mode, the buffer circuit integrates capacitance of the node capacitor to generate the voltage signal, and, in a proximity touch mode, the buffer circuit generates the voltage signal by following the voltages charged in the node capacitor throughout the predetermined first period,
   wherein the buffer circuit includes:
   a first operational amplifier;
   a third switch connected between a second node of the node capacitor and an inverting input terminal of the first operational amplifier;
   a fourth switch connected between the second node of the node capacitor and a common-mode voltage terminal;
   a fifth switch connected between the inverting input terminal and an output terminal of the first operational amplifier;
   a sixth switch connected between the second node of the node capacitor and a non-inverting input terminal of the first operational amplifier;
   a seventh switch connected between the non-inverting input terminal of the first operational amplifier and the common-mode voltage terminal; and
   a first feedback capacitor connected to the fifth switch in parallel, wherein, in the normal touch mode, the third switch is switched on and off by a third clock signal having a predetermined second period and the fourth switch and the fifth switch are switched on and off by a fourth clock signal having the predetermined second period, the sixth switch is turned off, the seventh switch is turned on, and the third clock signal and the fourth clock signal have a phase difference of 180 degrees with respect to each other.

2. The touch sensing device of claim 1, wherein the driving circuit includes:
   a first switch connected between a first node of the node capacitor and a supply voltage terminal; and
   a second switch connected between the first node of the node capacitor and a common-mode voltage terminal,
   wherein the first switch and second switches are switched on and off by first and second clock signals, wherein each of the first and second clock signals has the predetermined first period, and the first and second clock signals have a phase difference of 180 degrees with respect to each other.

3. The touch sensing device of claim 1, wherein the predetermined second period is equal to half of the predetermined first period.

4. The touch sensing device of claim 1, wherein, in the proximity touch mode, the third switch, the fourth switch and the seventh switch are turned off, and the fifth switch and the sixth switch are turned on.

5. The touch sensing device of claim 1, wherein the integration circuit includes:
   a second operational amplifier;
   an eighth switch connected between the inverting input terminal of the second operational amplifier and the buffer capacitor;
   a ninth switch connected between the buffer capacitor and the common-mode voltage terminal;
   a tenth switch connected between the inverting input terminal and an output terminal of the second operational amplifier; and
   a second feedback capacitor connected to the tenth switch in parallel.

6. The touch sensing device of claim 5, wherein, in the normal touch mode, the eighth switch is switched on and off by a fifth clock signal having the predetermined first period, the ninth switch is switched on and off by a sixth clock signal having the predetermined first period, and the fifth clock signal and the sixth clock signal have a phase difference of 180 degrees with respect to each other.

7. The touch sensing device of claim 6, wherein the fifth clock signal has a phase difference of 90 degrees with respect to the driving signal.

8. The touch sensing device of claim 5, wherein, in the proximity touch mode, the eighth switch is switched on and off by a fifth clock signal having the predetermined first period, the ninth switch is switched on and off by a sixth clock signal having the predetermined first period, and the fifth clock signal and the sixth clock signal have a phase difference of 180 degrees with respect to each other.

9. The touch sensing device of claim 8, wherein the fifth clock signal and the driving signal are in-phase.

10. A touch sensing device, comprising:
    a driving circuit applying a driving signal, having a predetermined first period, to a first node of a node capacitor by providing the driving signal to a first electrode of a touch panel representing the first node of the node capacitor;
    a first operational amplifier having a non-inverting input terminal and an inverting input terminal, each of the non-inverting input terminal and the inverting input terminal selectively connected to a second node of the node capacitor, and an output terminal connected to the inverting input terminal, with a second electrode of the touch panel representing the second node of the node capacitor;
a buffer capacitor being charged and discharged depending on an output voltage from the first operational amplifier; and
an integration circuit integrating voltages charged in the buffer capacitor,
wherein, when connected to the second node of the node capacitor, the first operational amplifier respectively operates more than once on stored charges from the node capacitor during the predetermined first period,
wherein the integration circuit includes:
a second operational amplifier;
an eighth switch connected between an inverting input terminal of the second operational amplifier and the buffer capacitor;
a ninth switch connected between the buffer capacitor and a common-mode voltage terminal;
a tenth switch connected between the inverting input terminal and an output terminal of the second operational amplifier; and
a second feedback capacitor connected to the tenth switch in parallel, wherein the eighth switch is switched on and off by a fifth clock signal having the predetermined first period, the ninth switch is switched on and off by a sixth clock signal having the predetermined first period, and the fifth clock signal and the sixth clock signal have a phase difference of 180 degrees with respect to each other.

11. The touch sensing device of claim 10, wherein the driving circuit includes:
a first switch connected between the first node of the node capacitor and a supply voltage terminal; and
a second switch connected between the first node of the node capacitor and a common-mode voltage terminal,
wherein the first switch and the second switch are switched on and off by first and second clock signals, wherein each of the first and second clock signals has the predetermined first period and the first and second clock signals have a phase difference of 180 degrees with respect to each other.

12. The touch sensing device of claim 10, wherein the fifth clock signal and the driving signal are in-phase.

13. A touchscreen device, comprising:
a panel unit including a plurality of first electrodes extending in a first direction, and a plurality of second electrodes extending in a second direction intersecting the first direction;
a driving circuit unit applying driving signals to a portion of the plurality of first electrodes; and
a sensing circuit unit detecting capacitance from a portion of the plurality of the second electrodes near one ends thereof and from a portion near the other ends thereof,
wherein the sensing circuit unit includes at least one operational amplifier behaving as a voltage follower;
wherein first and second electrodes, of the plurality of first electrodes and of the plurality of second electrodes and other than the portion of the plurality of electrodes and the portion of the plurality of second electrodes, are kept in a floating state during the applying of the driving signals or the detecting of the capacitance.

14. The touchscreen device of claim 13, wherein the sensing circuit unit includes:
a first operational amplifier having a non-inverting input terminal and an inverting input terminal connected to the portion of the plurality of the second electrodes near one ends thereof and to the portion near the other ends thereof, and an output terminal connected to the inverting input terminal;
a buffer capacitor being charged and discharged depending on an output voltage from the first operational amplifier; and
an integration circuit integrating voltages charged in the buffer capacitor.

15. The touchscreen device of claim 13, further comprising:
a signal conversion unit converting the capacitance detected in the sensing circuit unit into a digital signal; and
an operation unit determining whether a touch is made based on the digital signal.

16. The touchscreen device of claim 15, wherein the operation unit acquires first direction information of the touch based on the digital signal.

17. The touch sensing device of claim 1, wherein the driving signal is applied to a first electrode of a touch panel and the node capacitor represents a mutual capacitance generated between electrodes of the touch panel.

18. A touch sensing device, comprising:
a driving circuit applying a driving signal having a predetermined first period to a node capacitor;
a buffer circuit converting capacitance of the node capacitor into a voltage signal;
a buffer capacitor being charged and discharged depending on an output voltage from the buffer circuit; and
an integration circuit integrating voltages charged in the buffer capacitor,
wherein the buffer circuit includes:
a third switch connected between the node capacitor and an inverting input terminal of a first operational amplifier; and
a fifth switch connected between the inverting input terminal and an output terminal of the first operational amplifier,
wherein, in a normal touch mode, the buffer circuit integrates capacitance of the node capacitor to generate the voltage signal, and, in a proximity touch mode, the buffer circuit generates the voltage signal by following the voltages charged in the node capacitor, and
wherein, in the normal touch mode, the third switch is switched on and off by a third clock signal, the fifth switch is switched on and off by a fourth clock signal, the third clock signal and the fourth clock signal having a phase difference of 180 degrees with respect to each other.

19. The touch sensing device of claim 18, wherein the third and fourth clock signals have a predetermined second period that is half of the predetermined first period of the driving signal.

20. The touch sensing device of claim 19, wherein the driving signal is applied to a first electrode of a touch panel and the node capacitor represents a mutual capacitance generated between electrodes of the touch panel.

21. The touch sensing device of claim 18, wherein the buffer circuit further includes:
the first operational amplifier;
a fourth switch connected between the node capacitor and a common-mode voltage terminal;
a sixth switch connected between the node capacitor and a non-inverting input terminal of the first operational amplifier;

a seventh switch connected between the non-inverting input terminal of the first operational amplifier and the common-mode voltage terminal; and a first feedback capacitor connected to the fifth switch in parallel.

22. The touch sensing device of claim 21, wherein, in the normal touch mode, the third clock signal has a predetermined second period, the fifth switch is switched on and off by the fourth clock signal having the predetermined second period, the sixth switch is turned off, and the seventh switch is turned on.

23. The touch sensing device of claim 21, wherein, in the proximity touch mode, the third switch, the fourth switch and the seventh switch are turned off, and the fifth switch and the sixth switch are turned on.

24. The touch sensing device of claim 21, wherein the integration circuit includes:
a second operational amplifier;
an eighth switch connected between the inverting input terminal of the second operational amplifier and the buffer capacitor;
a ninth switch connected between the buffer capacitor and the common-mode voltage terminal;
a tenth switch connected between the inverting input terminal and an output terminal of the second operational amplifier; and
a second feedback capacitor connected to the tenth switch in parallel.

25. The touch sensing device of claim 24, wherein, in the normal touch mode or the in the proximity touch mode, the eighth switch is switched on and off by a fifth clock signal having the predetermined first period, the ninth switch is switched on and off by a sixth clock signal having the predetermined first period, and the fifth clock signal and the sixth clock signal have a phase difference of 180 degrees with respect to each other.

26. The touch sensing device of claim 25, wherein, in the normal touch mode, the fifth clock signal has a phase difference of 90 degrees with respect to the driving signal.

27. The touch sensing device of claim 25, wherein, in the proximity touch mode, the fifth clock signal and the driving signal are in-phase.

28. A touch sensing device, comprising:
a driving circuit applying a driving signal, having a predetermined first period, to a first node of a node capacitor;
a first operational amplifier having a non-inverting input terminal and an inverting input terminal, each of the non-inverting input terminal and the inverting input terminal selectively connected to a second node of the node capacitor, and an output terminal connected to the inverting input terminal;
a buffer capacitor being charged and discharged depending on an output voltage from the first operational amplifier; and
an integration circuit integrating voltages charged in the buffer capacitor,
wherein, when connected to the second node of the node capacitor, the first operational amplifier respectively operates more than once on stored charges from the node capacitor during the predetermined first period,
wherein the integration circuit includes:
a second operational amplifier;
an eighth switch connected between an inverting input terminal of the second operational amplifier and the buffer capacitor;
a ninth switch connected between the buffer capacitor and a common-mode voltage terminal;
a tenth switch connected between the inverting input terminal and an output terminal of the second operational amplifier; and
a second feedback capacitor connected to the tenth switch in parallel,
wherein the eighth switch is switched on and off by a fifth clock signal having the predetermined first period, the ninth switch is switched on and off by a sixth clock signal having the predetermined first period, and the fifth clock signal and the sixth clock signal have a phase difference of 180 degrees with respect to each other.

* * * * *